United States Patent [19]
Saliba et al.

[11] Patent Number: 6,067,481
[45] Date of Patent: May 23, 2000

[54] VIRTUAL MAGNETIC TAPE DRIVE LIBRARY SYSTEM

[75] Inventors: George Saliba, Northboro; Michelle M. Hall, Douglas; Weston St. A. Clarke, Shrewsbury, all of Mass.

[73] Assignee: Quantum Corporation, Milpitas, Calif.

[21] Appl. No.: 08/968,145

[22] Filed: Nov. 12, 1997

[51] Int. Cl.[7] .............................. G11B 5/09; G06F 13/24
[52] U.S. Cl. ...................................... 700/214; 360/73.08
[58] Field of Search ................................. 360/73.08, 35, 360/69, 53, 96, 92; 700/214

[56] References Cited

U.S. PATENT DOCUMENTS

| | | | |
|---|---|---|---|
| 5,231,552 | 7/1993 | Schnedider et al. | 360/92 |
| 5,325,370 | 6/1994 | Cleveland et al. | 360/53 |
| 5,546,557 | 8/1996 | Allen et al. | 395/438 |
| 5,608,584 | 3/1997 | Steinberg et al. | 360/69 |
| 5,760,995 | 6/1998 | Heller et al. | 360/92 |
| 5,892,633 | 4/1999 | Ayres et al. | 360/73.08 |

OTHER PUBLICATIONS

"Draft Proposed American National Standard Small Computer System Interface—2 (SCSI–II)", Sections 9.1.3 and 9.1.4, American National Standards Institute, Mar. 1990.

*Primary Examiner*—William Grant
*Assistant Examiner*—Kidest Bahta
*Attorney, Agent, or Firm*—Henry J. Groth

[57] ABSTRACT

A virtual magnetic tape drive library system that includes a host computer controller, a tape drive subsystem and a virtual multi-tape cartridge unit is set forth. The virtual multi-tape cartridge unit includes a housing having a hollow central cavity, the cavity further includes a central spool with magnetic tape spooled thereon. The central spool supplies magnetic tape to a tape drive subsystem during data processing operations. The magnetic tape has a number of parallel longitudinal data tracks defined thereon, wherein the data tracks are arranged into a number of track groups. Each track group has a logical beginning of media (BOM) field and a logical end of media (EOM) field positioned near respective ends thereof. The logical BOM and EOM fields uniquely identify each track group. Consequently, each data track group emulates a logical sub-tape cartridge that may be individually identified as well as selected for data processing operations thereon.

14 Claims, 4 Drawing Sheets

VIRTUAL MAGNETIC TAPE DRIVE LIBRARY SYSTEM

CROSS-REFERENCE TO RELATED PATENTS

This invention relates to the following patents/applic. all of which are assigned to the assignee of this application as of the date of filing: U.S. Pat. No. 5,608,584, entitled, "Recognition of Tape Recording Media Type Using Plural In-Line Holes" to Steinberg et al.; U.S. Pat. No. 5,231,552, entitled, "Magazine and Receiver For Media Cartridge Loader" to Schneider et al; U.S. Pat. No. 5,760,995 entitled, "A Multi-Drive, Multi-Magazine Mass Storage and Retrieval Unit for Tape Cartridges" filed on Sep. 11, 1996, the disclosures of which are herein incorporated by reference.

FIELD OF THE INVENTION

The invention relates generally to virtual magnetic tape library system and more precisely to a virtual multi-tape cartridge unit for use within a tape drive subsystem that cooperates with a host computer controller to form the virtual magnetic tape library system.

BACKGROUND OF THE INVENTION

A conventional magnetic tape drive library system includes a number of tape drive slots; a number of magnetic tape cartridge magazine slots; and a tape cartridge elevator positioned intermediate the tape drive slots and the magnetic tape cartridge magazine slots. The elevator is linearly movable along a guide shaft and may be actuated by a motor for positioning the elevator adjacent to either a magazine slot or a tape drive slot. Further, the elevator includes a mechanism for engaging a tape cartridge; extracting the tape cartridge from the magazine slot and for inserting the tape cartridge into a targeted tape drive. After completion of data processing operations with a particular tape cartridge, the elevator mechanism will again engage the tape cartridge and transport the cartridge back to its original magazine slot.

In this aspect, the tape drive library system further includes a housing having one side wall adapted for receiving the number of tape cartridge magazines, and another side wall adapted for receiving the number of tape drives. The tape cartridge magazines are typically loaded with a plurality of tape cartridges prior to being introduced to the library system.

An external host computer controller is connected to the tape library system for controlling data processing operations during use of the system. The host computer controller issues commands to a microcontroller that is preprogrammed with a media changer command control set. The command set essentially controls functional operations of the tape library system, such as: selecting and loading a tape cartridge, as well as formatting, locating, overwriting, erasing, and reading/writing data on the magnetic storage tape within the tape cartridge.

One drawback of conventional mechanized tape library systems is the relatively long response time to a request for data. The long response time is principally attributed to the inherent mechanical latencies defined within the system. The mechanical latencies involved in a request for data are derived from the steps the library system must follow in order to fulfill the data request, such as, moving an elevator to a tape cartridge magazine slot and physically extracting the cartridge. Thereafter the elevator must move the cartridge to a targeted tape drive and after loading the cartridge into the tape drive, the drive must spool the tape to the appropriate storage location of the sought after data stored on the tape. Because of such data transfer latencies, tape library system applications have been limited to archival storage/retrieval applications for a relatively large number of faster input/output data processing systems such as disk drives or solid state electronic storage devices.

Another drawback of tape library systems is directed to the under utilization of the storage capacity of the tape cartridges within the tape library system. More precisely, since conventional tape cartridges require sequential data access, a conventional tape library system inherently requires substantial system resources to store/retrieve many different types of user data on a single tape cartridge or to split user data between the tail end of one cartridge and the beginning of another cartridge. Therefore, tape library systems may store a single type of user data on a single tape cartridge and simply begin storage of another type of user data on a subsequent tape cartridge regardless of whether the former tape cartridge is full. This significantly under utilizes the storage capacity of a tape library system.

Thus, a hitherto unsolved need has remained for a simplified magnetic tape drive library system with increased data access rates that may make substantial use of current control microcode, e.g., media changer command control sets. Further, a need has remained for a simplified magnetic tape drive library system that fully uses the storage capacity of a tape cartridge.

SUMMARY OF THE INVENTION

In accordance with principles of the present invention, a virtual multi-tape cartridge unit for use within a magnetic tape drive subsystem is set forth. The virtual multi-tape cartridge unit includes a housing that has a hollow central cavity with a rotatably mounted central spool. The central spool has magnetic tape wound thereon for supplying the magnetic tape drive subsystem with magnetic tape during data processing operations. The magnetic tape has a number of parallel longitudinal data tracks defined thereon, wherein the data tracks are arranged into a number of track groups. Each track group has a logical beginning of media (BOM) field and a logical end of media (EOM) field positioned near respective ends thereof. The logical BOM and EOM fields uniquely identify each track group. Consequently, each data track group emulates a logical sub-tape cartridge that may be individually identified as well as selected for data processing operations thereon.

The virtual multi-tape cartridge unit may be used within a single tape drive in conjunction with a host computer controller system to form a virtual magnetic tape drive library system. The host essentially communicates data processing control information to a virtual library microcontroller within the tape drive subsystem. Furthermore, the media changer control commands, which are implemented in the form of microcode programmed into the host, require minimal or no modifications from the media changer control commands used in a conventional mechanized tape loader library systems. Therefore, minimal or no programming is required in retrofitting the mechanized tape loader library system with the instant invention.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
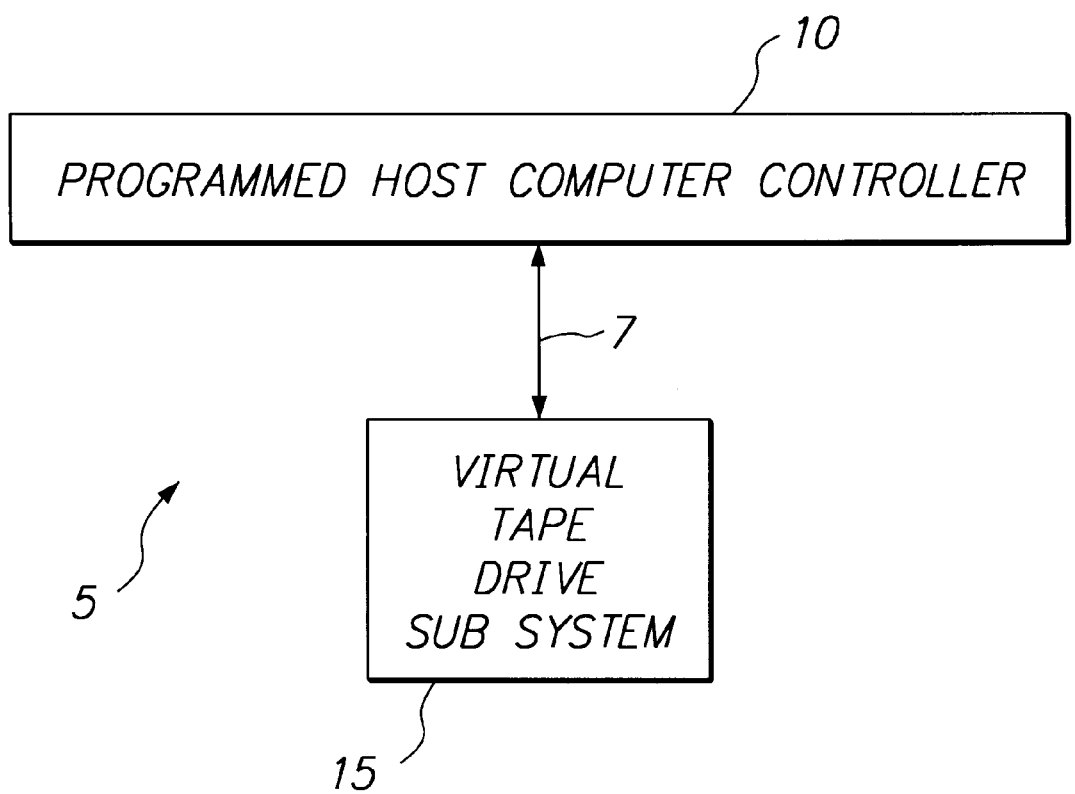
FIG. 1 is a block diagram of the virtual tape library system connected to a host computer controller.
Figure 2:
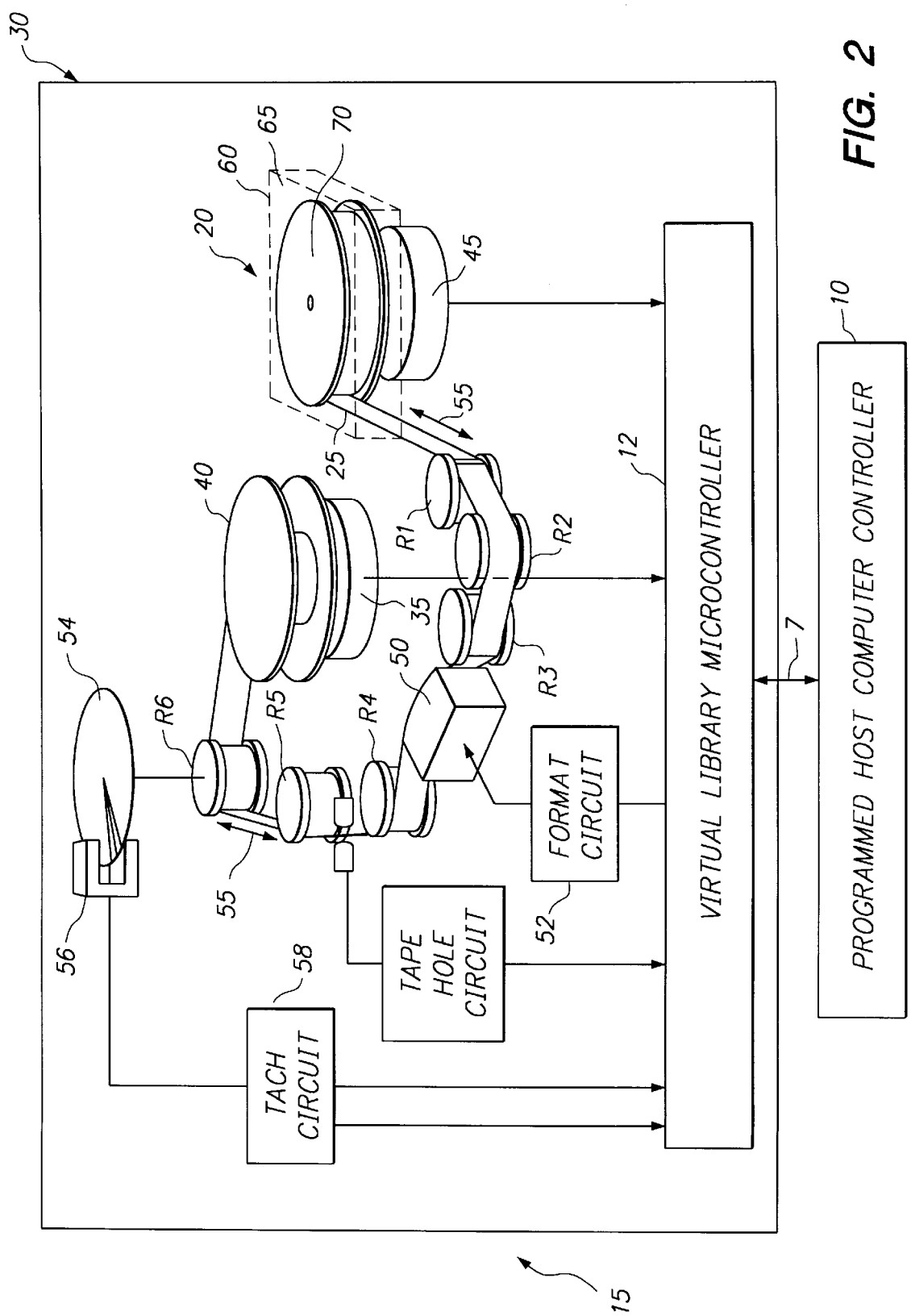
FIG. 2 is structural/electrical block diagram illustrating structural mechanical and electrical features of the FIG. 1 example of the present invention.
Figure 3:
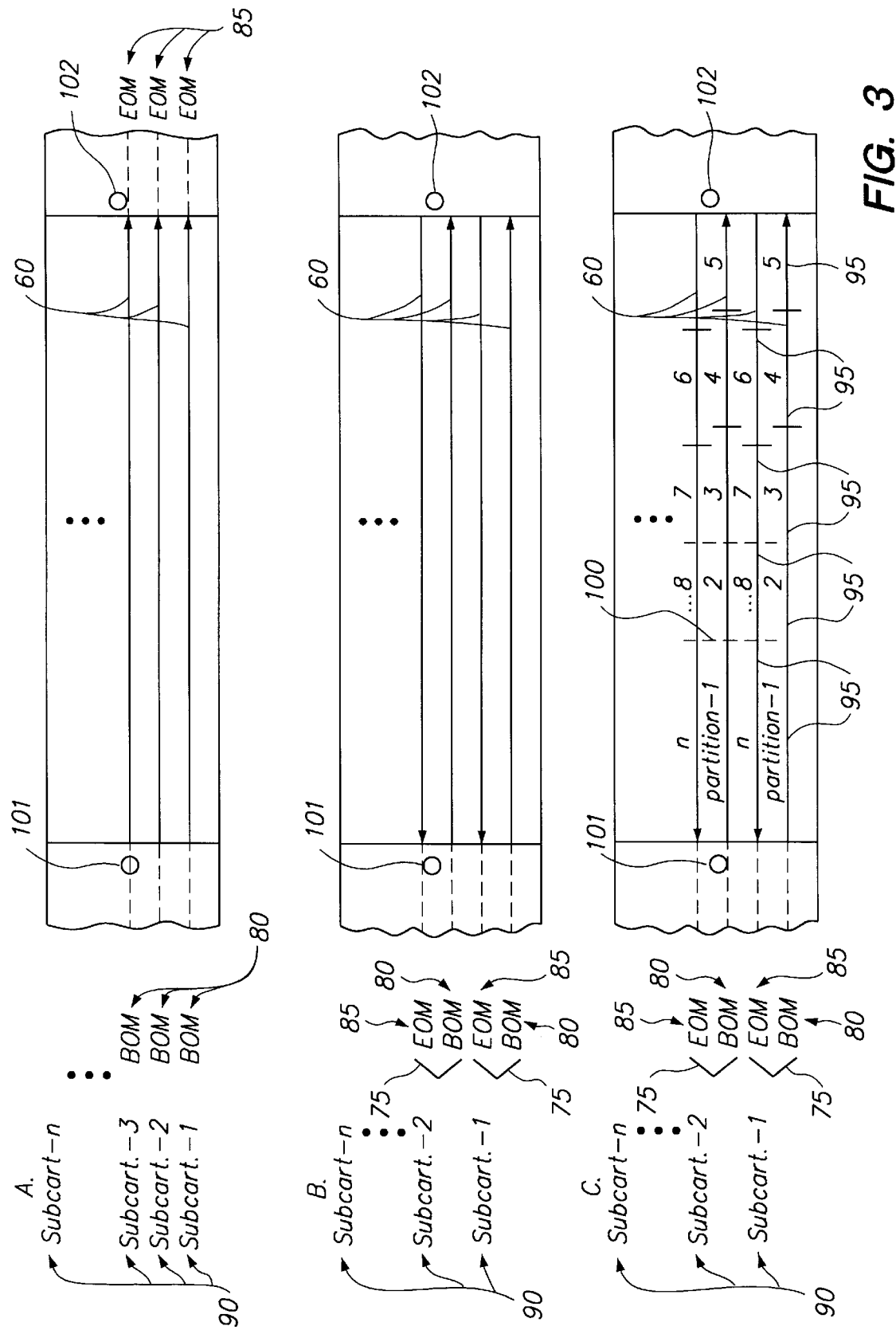
FIG. 3 is a series of diagrams of magnetic tapes having data tracks that are subdivided into a number of individually identified track groups that further define sub-tape cartridges.

Referring to FIGS. 1–3, one preferred embodiment of the present invention as set forth herein is a virtual magnetic tape drive library system 5 that includes a host computer controller 10, a tape drive subsystem 15 and a virtual multi-tape cartridge unit 20.

The host computer controller 10 is connected by means of a data communication bus 7 to the tape drive subsystem 15 and issues data processing control commands to the tape drive subsystem 15. One preferred data communication bus for forming such a connection is a Small Computer System Interconnect bus, e.g. a SCSI-2 bus. Moreover, one preferred control command set is known as the SCSI-2 medium changer command set. This medium changer command set is programmed into the virtual library microcontroller 12 in the form of microcode and thus predefines functions available to the virtual tape library system 5. Typical data processing control commands include, selecting and loading a virtual multi-tape cartridge unit 20, as well as formatting, locating, overwriting, erasing, and reading/writing data on the magnetic storage tape 25 within the virtual multi-tape cartridge unit 20.

It has been realized that this control command set, which is programmed in to the host 10 computer controller, can control the data processing functions of a single tape drive subsystem 15 incorporating the single multi-tape cartridge unit 20 with minimal or no modification to the command control set.

A tape drive subsystem 15 generally comprises a rectangular housing 30 that has a base (not shown) for supporting two spindle motors. The first spindle motor 35 has a permanently mounted take-up spool 40 dimensioned to accept a relatively high speed streaming magnetic tape 25. The second spindle motor 45 is adapted to accept the removable virtual multi-tape cartridge unit 20. The removable virtual multi-tape cartridge unit 20 is manually or automatically inserted into the drive 15 via a slot (not shown) formed on the drive's housing 30. Upon insertion of the virtual multi-tape cartridge unit 20 into the slot, the cartridge 20 engages the second spindle motor 45. Prior to rotation of the first 35 and second 45 spindle motors, the magnetic tape 25 within the removable cartridge 20 is connected to the permanently mounted take-up spool 40 by means of a mechanical buckling mechanism (not shown). A number of rollers R1–R6 positioned intermediate the multi-tape cartridge unit 20 and the permanent take-up spool 40 guide the magnetic tape 25 as it traverses at relatively high speeds back and forth between the multi-tape cartridge unit 20 and the permanently mounted take-up spool 40. A magnetic tape head 50 positioned along the tape path 55 may read/write a multiplicity of parallel longitudinal data tracks 60 on the tape as the tape streams back and forth between the take-up spool 40 and the multi-tape cartridge unit 20.

The virtual multi-tape cartridge unit 20 for use within the magnetic tape drive subsystem 15 includes a housing 30 that has a hollow central cavity 65. A central supply spool 70 with the magnetic tape 25 wound thereon is rotatably mounted within the cavity 65 and supplies magnetic tape 25 to the tape drive subsystem 15. The parallel longitudinal data tracks 60 defined on the magnetic tape 25 are arranged into a number of track groups 75. Furthermore, each track group 75 is individually associated with an identifying logical beginning of media (BOM) field 80 and a logical end of media (EOM) field 85 positioned near respective ends thereof. By subdividing the longitudinal data tracks 60 on the magnetic storage tape 25 into a number of individually identified track groups 75, each data track group 75 emulates a logical sub-magnetic tape cartridge 90. Therefore, a single multi-tape cartridge unit 20, according to principles of the present invention, may include a multiplicity of longitudinal data tracks 60 that are subdivided into a predetermined number of logical sub-tape cartridges 90 with each logical sub-tape cartridge 90 having a unique identifier field, e.g. logical BOM 80 and EOM 85 fields respectively.

The logical BOM 80 and EOM 85 fields may each comprise a unique series of binary symbols, e.g. 1's and 0's, for identifying the position of each logical sub-tape cartridge 90. More preferably, the logical BOM 80 and EOM 85 fields may each be registered to either a physical beginning of tape (BOT) 101 hole or a physical end of tape (EOT) 102 hole. More precisely, the logical BOM 80 fields may be registered to the BOT 101 hole and the logical EOM 85 fields may be defined by a predetermined tachometer count distance measured from the BOT 101 hole. Alternatively, the logical BOM 80 fields may be registered to the EOT hole and the logical EOM 85 fields may be defined by a predetermined tachometer count distance measured from the EOT 102 hole.

As shown in FIG. 2, one of the tape guide rollers R6 is coupled to an optical tachometer encoder disk 54 which generates signal patterns in relation to actual tape distance traveled in the forward and in the reverse tape 25 directions. A tachometer module 56 generates a collimated light beam which passes through the encoder disk to a photodetector array which puts out electrical signals indicative of this tape movement. Additionally, a tachometer circuit 58 monitors the electrical signals, determines relative tape distance traveled, and communicates such information to the virtual library microcontroller 12.

Although there are numerous schemes of grouping the data tracks 60 into sub-tape cartridges 90 without departing from the spirit and scope of the invention, one preferred data track grouping 75 comprises each sub-tape cartridge 90 having at least one longitudinal data track 60 traversing the length of the tape 25 as shown in FIG. 3A. Another preferred data track grouping 75 includes a number of pairs of parallel longitudinal data tracks 60, where one or more data tracks 60 are processed in a forward tape 25 direction and one or more data tracks 60 are processed in a reverse tape 25 direction as shown in FIG. 3B.

Referring to FIG. 3C, the longitudinal data tracks 60 grouped into each sub-tape cartridge 90 defined on the magnetic tape 25 may be further subdivided into a number of partitions 95. Additionally, the partitions 95 may also each have unique identifier fields 100 positioned near the respective ends of the partitions 95. The identifier fields may include a unique series of 1's and 0's for individually identify each partition 95. As a result, a read/write head may be moved directly between partitions defined within the same logical sub-tape cartridge or alternatively, the read/write head may be moved directly between partitions defined within different logical sub-tape cartridges.

Referring to FIG. 3D, yet another preferred data track grouping 75 includes a number of logical sub-tape cartridges 90 defined along the longitudinal length of the tape 25. However, the data tracks 60 defined within the sub-tape cartridges 90 extend a distance less than the entire length of the tape 25. More precisely, the data tracks 60 of each sub-tape cartridge 90 are confined to a predetermined segment of the tape 25, wherein each segment defines a logical sub-tape cartridge. Moreover, each logical sub-tape cartridge 90 may include any one of the data track 60 formats previously described in FIGS. 3A–3C. Furthermore, the physical BOT 101 and EOT 102 holes positioned intermediate the sub-tape cartridges 90 operate as either a BOT 101 or an EOT 102 hole. Specifically, in processing a logical sub-tape cartridge 90, the BOT 101 hole is defined at a proximate end of the sub-tape cartridge 90 and the EOT 102 hole is defined at the distal end of the sub-tape cartridge 90. Thus, in processing successive sub-tape cartridges 90, a former EOT 102 hole may operate as a BOT 101 hole.

Figure 4:
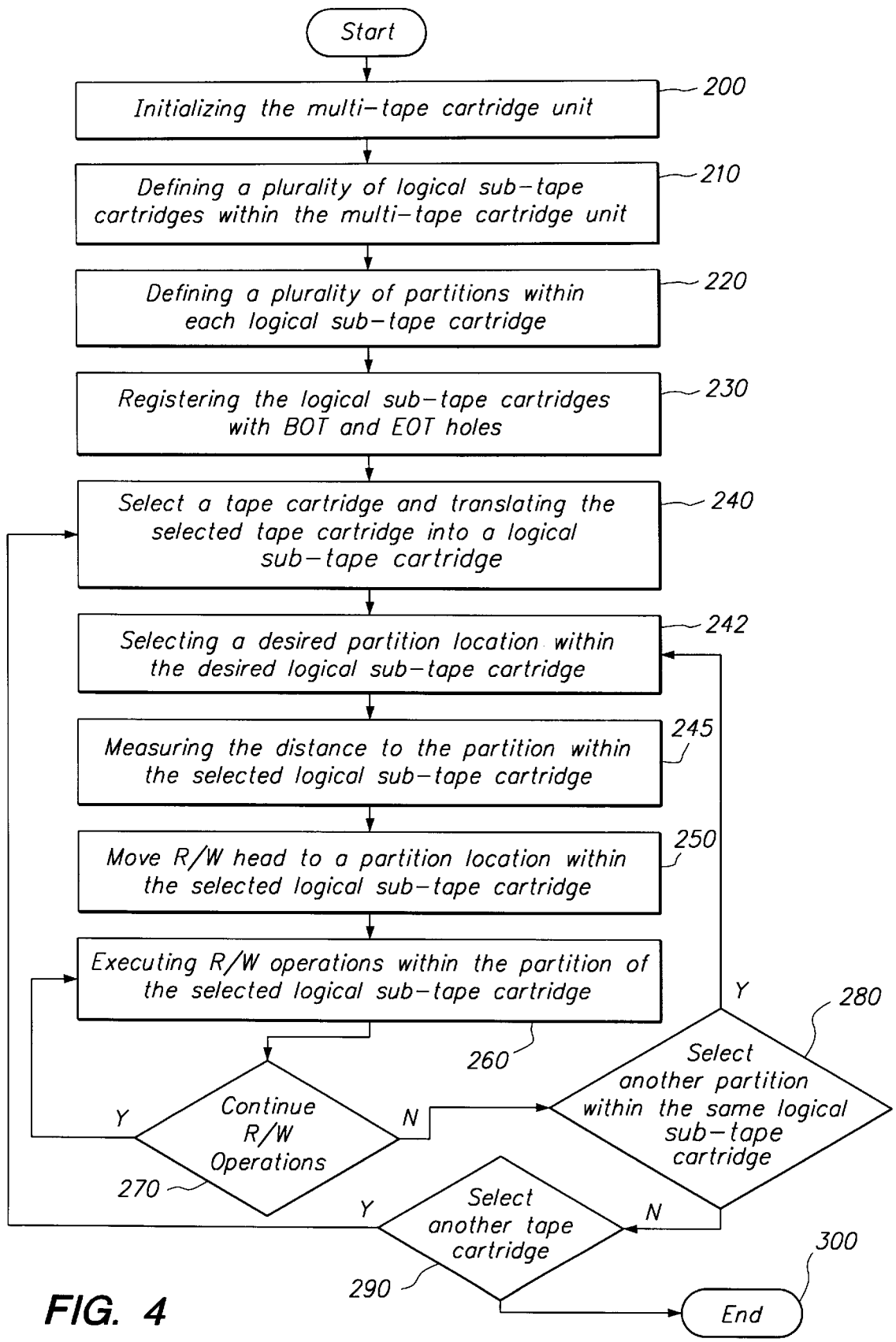
FIG. 4 shows a flow chart illustrating one preferred method for carrying out data processing operations with the virtual tape library system, shown in FIGS. 1–3, in accordance with principles of the present invention.

Referring to FIG. 4, during operation of the virtual magnetic tape library system 5, a single tape drive subsystem 15 emulates a conventional multiple tape cartridge tape library system (not shown) by employing a single virtual multi-tape cartridge unit 20. The method of implementing the virtual magnetic tape library system 5 includes the steps of loading the virtual multi-tape cartridge unit into the magnetic tape drive subsystem 15 and then initializing the multi-tape cartridge unit 200 with a format circuit 52, as shown in FIG. 2. The format circuit 52 essentially formats and defines a plurality of logical sub-tape cartridges within the multi-tape cartridge unit 210. The format circuit further defines a plurality of partitions within each of the logical sub-tape cartridges 220. Additionally, each of the logical sub-tape cartridges are registered with the physical BOT and EOT holes 230 such that the distances between the holes and the logical sub-tape cartridges can be sensed and measured. Thus, this measured distance is used for controlling and moving a read/write head to a selected partition location defined within the logical sub-tape cartridge 250. Accordingly, the computer controller 10 issues a command to the tape drive subsystem 15 for selecting a tape cartridge and translating the desired tape cartridge into a logical sub-tape cartridge 240. Then the computer controller 10 may select a desired partition location defined within the logical sub-tape cartridge 242. After selecting the partition location, the virtual library microcontroller 12 further measures the distance and verifies the measurement to the selected logical sub-tape cartridge 245 such that the read/write head will be accurately positioned thereon. Thereafter the read/write head is moved to the selected partition location defined within the logical sub-tape cartridge 250.

After moving the read/write head to the selected partition location 250, the head executes reading and writing operations within the selected partition of the logical sub-tape cartridge 260. The tape drive subsystem will continue read/write operations 270 until instructed to do otherwise. Upon completion or ending of such operations, the host computer controller 10 may issue an instruction to select another partition within the same logical sub-tape cartridge 280 for repeating the read/write operation thereon. Alternatively, the host computer controller may issue an instruction to select another partition within another logical sub-tape cartridge 290 for again repeating said read/write operations. If the host computer controller 10 neither selects another partition 280 nor selects another tape cartridge 290, then data processing operations will be ended 300.

The above described virtual magnetic tape drive library system 5 has many advantages over the prior art, such as, an increased data access rate because of minimization of mechanical latencies associated with conventional tape library systems. Further, the virtual magnetic tape drive library system 5 makes substantial use of current media changer command control set microcode that is programmed into the host computer controller 10. Therefore, minimal micro-code updates are required in implementing the virtual tape library system 5 of the instant invention in lieu of a conventional tape library system.

Additionally, the storage capacity of the virtual multi-tape cartridge unit 20 is more efficiently used in comparison to the convention tape cartridge.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A virtual multi-tape cartridge unit coupled to a controller, the virtual multi-tape cartridge unit comprising:
   a housing having a hollow central cavity, the cavity having a central spool with magnetic tape spooled thereon; and
   a number of parallel longitudinal data tracks defined on the magnetic tape, the data tracks arranged into a number of track groups, each track group having a logical beginning of media (BOM) field and a logical end of media (EOM) field, each track group emulates a logical sub-tape cartridge, the controller uses the BOM field and the EOM field to communicate with the logical sub-tape cartridge as a distinct tape.

2. The virtual multi-tape cartridge of claim 1, wherein each of the logical sub-tape cartridges includes at least one longitudinal data track, the data track traversing the length of the tape.

3. The virtual multi-tape cartridge of claim 1, wherein each of the logical sub-tape cartridge includes at least one data track, the data track being confined to a predetermined segment of the tape.

4. The virtual multi-tape cartridge unit of claim 2, wherein the longitudinal data tracks defined within the logical sub-tape cartridge are further divided into partitions.

5. A virtual magnetic tape drive library system comprising:
   (A) a host computer controller system for communicating data processing control information;
   (B) a magnetic tape drive subsystem connected to a host computer controller system;
   (C) a virtual multi-tape cartridge unit for use within the magnetic tape drive subsystem, the virtual multi-tape cartridge unit further comprising:
      (i) a housing having a hollow central cavity, the cavity having a central spool with magnetic tape spooled thereon;

(ii) a number of parallel longitudinal data tracks defined on the magnetic tape, the data tracks being arranged into a number of track groups, each track group having a logical beginning of media (BOM) field and a logical end of media (EOM) field, each track group emulates a logical sub-tape cartridge, the host computer controller system having processing resources using the BOM field and the EOM field to communicate with the at least one of the logical sub-tape cartridges as a distinct tape to move the at least one of the logical sub-tape cartridges among different virtual drives within the virtual magnetic tape drive library system.

6. The virtual magnetic tape drive library system of claim 5, wherein each of the logical sub-tape cartridge includes at least one longitudinal data track, the data track traversing the length of the tape.

7. The virtual magnetic tape drive library system of claim 5, wherein each of the logical sub-tape cartridges includes a least one data track, the data track being confined to a predetermined segment of the tape.

8. The virtual magnetic tape drive library system of claim 6, wherein the longitudinal data tracks defined within the logical sub-tape cartridges are partitioned.

9. A method for emulating a magnetic tape drive library system, the method comprising the steps of:

(A) initializing a multi-tape cartridge unit;

(B) defining a plurality of logical sub-tape cartridges within the multi-tape cartridge unit;

(C) defining a plurality of partitions within the logical sub-tape cartridges;

(D) registering at least one of the logical sub-tape cartridges with a beginning of tape hole (BOT) and an end of tape hole (EOT);

(E) selecting a tape cartridge and translating the selected tape cartridge into one of the logical sub-tape cartridges;

(F) selecting a desired partition location defined within the one of the logical sub-tape cartridges, the one of the logical sub-tape cartridges being defined on the multi-tape cartridge unit, the selecting including communicating with the one of the logical sub-tape cartridges as a distinct tape;

(G) moving a read/write head to the selected partition location defined within the one of the logical sub-tape cartridges;

(H) executing read/write operations within the selected partition location of the one of the logical sub-tape cartridges; and (I) ending read/write operations within the selected partition location of the one of the logical sub-tape cartridges.

10. The method for emulating a magnetic tape drive library system of claim 9, wherein the method further comprises repeating steps F–I for subsequently selected partition locations within the one of the logical sub-tape cartridges.

11. The method for emulating a magnetic tape drive library system of claim 9, wherein the method further comprises repeating steps E–I for subsequently selected tape cartridges.

12. The method for emulating a magnetic tape drive library system of claim 9, wherein after the step of selecting a desired partition location defined within the one of the logical sub-tape cartridges, the method further comprises measuring and verifying the distance to the one of the logical sub-tape cartridges.

13. The virtual multi-tape cartridge unit of claim 1, wherein the logical sub-tape cartridge communications with the host computer controller system as a distinct tape to:

virtually move the logical sub-tape cartridge from a first library slot to a drive; and virtually move the logical sub-tape cartridge from the drive to a second library slot.

14. The method for emulating a magnetic tape drive library system of claim 9, wherein:

the one of the logical sub-tape cartridges in virtually located in a first virtual drive disposed in a virtual magnetic tape drive library system; and the selecting a tape cartridge step includes moving the one of the logical sub-tape cartridges to a second virtual drive disposed in the virtual magnetic tape drive library system.

* * * * *